(12) United States Patent
Ko et al.

(10) Patent No.: US 12,382,130 B2
(45) Date of Patent: Aug. 5, 2025

(54) SYSTEMS AND METHODS FOR DECODING MULTIPLE SYMBOLS PER CLOCK CYCLE

(71) Applicant: Apple Inc., Cupertino, CA (US)

(72) Inventors: Ka-Shu Ko, San Ramon, CA (US); Abheek Banerjee, Palo Alto, CA (US)

(73) Assignee: Apple Inc., Cupertino, CA (US)

(*) Notice: Subject to any disclaimer, the term of this patent is extended or adjusted under 35 U.S.C. 154(b) by 32 days.

(21) Appl. No.: 18/407,151

(22) Filed: Jan. 8, 2024

(65) Prior Publication Data

US 2025/0088707 A1    Mar. 13, 2025

Related U.S. Application Data

(60) Provisional application No. 63/538,004, filed on Sep. 12, 2023.

(51) Int. Cl.
*H04N 21/44* (2011.01)
*G06F 1/03* (2006.01)
*H04N 21/4402* (2011.01)

(52) U.S. Cl.
CPC ........... *H04N 21/4402* (2013.01); *G06F 1/03* (2013.01); *H04N 21/44008* (2013.01)

(58) Field of Classification Search
CPC . H04N 21/4402; H04N 21/44008; G06F 1/03
USPC ..................................................... 375/240.01
See application file for complete search history.

(56) References Cited

U.S. PATENT DOCUMENTS

| | | | |
|---|---|---|---|
| 5,857,036 A * | 1/1999 | Barnsley | G06T 9/001 382/248 |
| 7,079,050 B2 | 7/2006 | Van Der | |
| 7,439,886 B2 | 10/2008 | Zhan | |
| 7,924,180 B2 | 4/2011 | Chang | |
| 8,761,240 B2 | 6/2014 | Martin-Cocher | |
| 9,706,214 B2 | 7/2017 | Wu | |
| 11,438,634 B2 | 9/2022 | Zhao | |

FOREIGN PATENT DOCUMENTS

WO    2018218950 A1    12/2018

* cited by examiner

*Primary Examiner* — Dominic D Saltarelli
(74) *Attorney, Agent, or Firm* — Fletcher Yoder, P.C.

(57) ABSTRACT

To improve video parser performance and reduce bottleneck, a video parser may parse a video stream to decode multiple symbols per clock cycle. By decoding multiple symbols per clock cycle, the video parser may decode symbols more quickly and efficiently compared to decoding one symbol per clock cycle, and thus may be less likely to act as a bottleneck for remaining video decoding operations.

21 Claims, 9 Drawing Sheets

SYSTEMS AND METHODS FOR DECODING MULTIPLE SYMBOLS PER CLOCK CYCLE

CROSS-REFERENCE TO RELATED APPLICATIONS

This application claims priority to U.S. Provisional Patent Application No. 63/538,004 entitled "SYSTEMS AND METHODS FOR DECODING MULTIPLE SYMBOLS PER CLOCK CYCLE," filed on Sep. 12, 2023, which is hereby incorporated by reference in its entirety for all purposes.

BACKGROUND

This disclosure relates to systems and methods for improving video parser performance by enabling decoding of multiple symbols per clock cycle.

A summary of certain embodiments disclosed herein is set forth below. It should be understood that these aspects are presented to provide the reader with a brief summary of these certain embodiments and that these aspects are not intended to limit the scope of this disclosure.

Video encoding or video compression is the process of converting raw video data into a compressed format to reduce the size of the raw video data while maintaining an acceptable level of visual quality. A video parser is a software component that may analyze and interpret the structure of a video file by parsing a bitstream of the video file. The bitstream may include compressed (e.g., encoded) video data organized into a sequence of bits that represents the frames of a video, motion vectors, quantization parameters, and other information that may be used to reconstruct a video during the decoding process.

The video parser may, along with one or more video decoders, be used to decode a video stream in a particular format and re-encode the results into low level video instructions defined by a specification of that format. For example, a video parser specific to AOMedia Video 1 (AV1) may decode a video stream in the AV1 format and re-encode the results into low-level video instructions. In some cases, a video parser may act as a bottleneck, as further video decoding may not take place until the parser has parsed a symbol from a video stream.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

To improve video parser performance and reduce bottleneck, the video parser may parse a video stream to decode multiple symbols per clock cycle. By decoding multiple symbols per clock cycle, the video parser may decode symbols more quickly and efficiently compared to decoding one symbol per clock cycle, and thus may be less likely to act as a bottleneck for remaining video decoding operations.

The video parser may include multiple symbol decoders, each symbol decoder configured to decode multiple coefficient base symbols per clock cycle and configured to decode multiple sign bit symbols per clock cycle. A first symbol decoder may decode a coefficient base symbol based on cumulative distribution function (CDF) information received from a CDF lookup table (LUT). The first symbol decoder may output a first decoded coefficient base symbol and symbol range and symbol value information associated with the first decoded symbol for a given clock cycle. The first symbol decoder may then pass the decoded coefficient base symbol and/or the symbol range and symbol value information associated with the first decoded symbol to a second decoder. The second decoder may decode a second coefficient base symbol for the given clock cycle based on CDF information received from the CDF LUT and the decoded coefficient base symbol and/or the symbol range and the symbol value information associated with the first decoded symbol.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

FIG. 11 is an illustration of a video block indicating the order in which coefficient base values are programmed into the index positions of the video block, in accordance with an embodiment; and FIG. 12 illustrates examples of decoding multiple sign bit symbols per clock cycle, in accordance with an embodiment.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

A video parser may be used to decode a video stream in a particular format and re-encode the results into low level video instructions defined by a specification of that format. For example, a video parser specific to AOMedia Video 1 (AV1) may decode a video stream in the AV1 format and re-encode the results into low-level video instructions defined by the AVD3 AV1 architecture specification. In some cases, a video parser may act as a bottleneck, as further video decoding may not take place until the parser has parsed a symbol from a video stream.

To improve video parser performance and reduce bottleneck, the video parser may parse a video stream to decode multiple symbols per clock cycle. By decoding multiple symbols per clock cycle, the video parser may decode symbols more quickly and efficiently compared to decoding one symbol per clock cycle, and thus may be less likely to act as a bottleneck for remaining video decoding operations.

Figure 1:
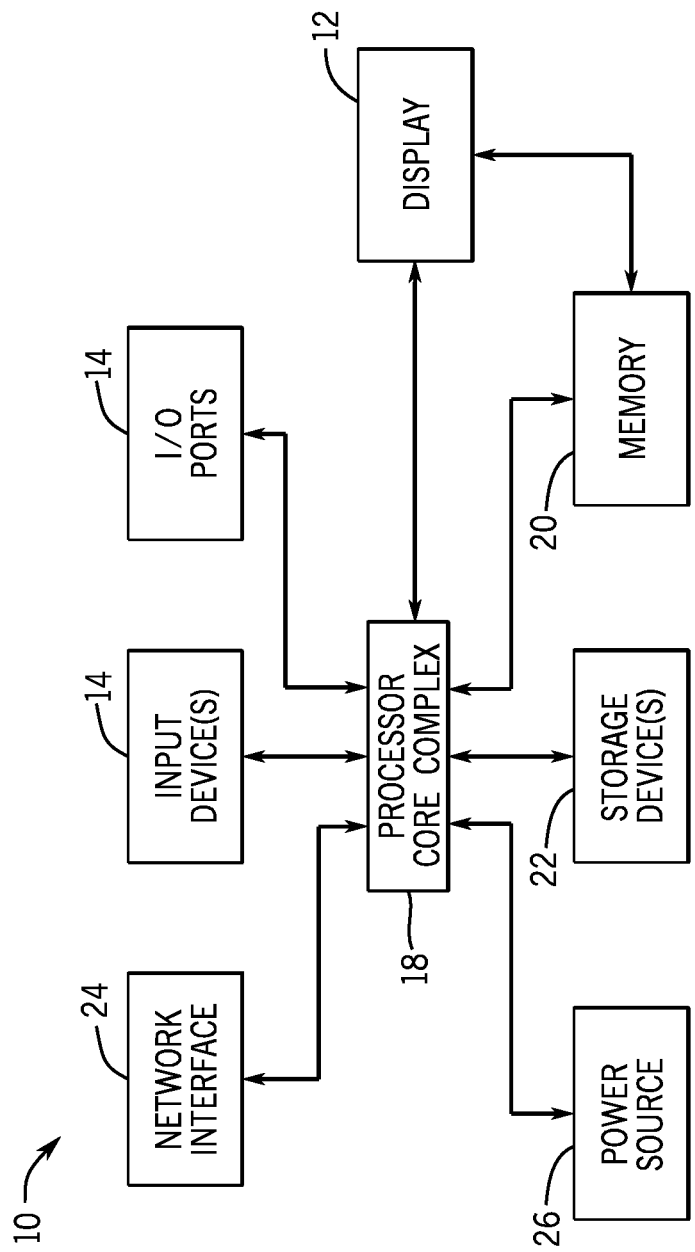
FIG. 1 is a block diagram of an electronic device having an electronic display, in accordance with an embodiment.

With this in mind, an example of an electronic device 10, which includes an electronic display 12 that may benefit from these features, is shown in FIG. 1. FIG. 1 is a schematic block diagram of the electronic device 10. The electronic device 10 may be any suitable electronic device, such as a computer, a mobile (e.g., portable) phone, a portable media device, a tablet device, a television, a handheld game platform, a personal data organizer, a virtual-reality headset, a mixed-reality headset, a wearable device, a watch, a vehicle dashboard, and/or the like. Thus, it should be noted that FIG. 1 is merely one example of a particular implementation and is intended to illustrate the types of components that may be present in an electronic device 10.

In addition to the electronic display 12, as depicted, the electronic device 10 includes one or more input devices 14, one or more input/output (I/O) ports 16, a processor core complex 18 having one or more processors or processor cores and/or image processing circuitry, memory 20, one or more storage devices 22, a network interface 24, and a power supply 26. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the memory 20 and the storage devices 22 may be included in a single component. Additionally, or alternatively, image processing circuitry of the processor core complex 18 may be disposed as a separate module or may be disposed within the electronic display 12.

The processor core complex 18 is operably coupled with the memory 20 and the storage device 22. As such, the processor core complex 18 may execute instructions stored in memory 20 and/or a storage device 22 to perform operations, such as generating or processing image data. The processor core complex 18 may include one or more microprocessors, one or more application specific processors (ASICs), one or more field programmable logic arrays (FPGAs), or any combination thereof.

In addition to instructions, the memory 20 and/or the storage device 22 may store data, such as image data. Thus, the memory 20 and/or the storage device 22 may include one or more tangible, non-transitory, computer-readable media that store instructions executable by processing circuitry, such as the processor core complex 18, and/or data to be processed by the processing circuitry. For example, the memory 20 may include random access memory (RAM) and the storage device 22 may include read only memory (ROM), rewritable non-volatile memory, such as flash memory, hard drives, optical discs, and/or the like.

The network interface 24 may enable the electronic device 10 to communicate with a communication network and/or another electronic device 10. For example, the network interface 24 may connect the electronic device 10 to a personal area network (PAN), such as a Bluetooth network, a local area network (LAN), such as an 802.11x Wi-Fi network, and/or a wide area network (WAN), such as a fourth-generation wireless network (4G), LTE, or fifth-generation wireless network (5G), or the like. In other words, the network interface 24 may enable the electronic device 10 to transmit data (e.g., image data) to a communication network and/or receive data from the communication network.

The power supply 26 may provide electrical power to operate the processor core complex 18 and/or other components in the electronic device 10, for example, via one or more power supply rails. Thus, the power supply 26 may include any suitable source of electrical power, such as a rechargeable lithium polymer (Li-poly) battery and/or an alternating current (AC) power converter. A power management integrated circuit (PMIC) may control the provision and generation of electrical power to the various components of the electronic device 10.

The I/O ports 16 may enable the electronic device 10 to interface with another electronic device 10. For example, a portable storage device may be connected to an I/O port 16, thereby enabling the electronic device 10 to communicate data, such as image data, with the portable storage device.

The input devices 14 may enable a user to interact with the electronic device 10. For example, the input devices 14 may include one or more buttons, one or more keyboards, one or more mice, one or more trackpads, and/or the like. Additionally, the input devices 14 may include touch sensing components implemented in the electronic display 12, as described further herein. The touch sensing components may receive user inputs by detecting occurrence and/or position of an object contacting the display surface of the electronic display 12.

In addition to enabling user inputs, the electronic display 12 may provide visual representations of information by displaying one or more images (e.g., image frames or pictures). For example, the electronic display 12 may display a graphical user interface (GUI) of an operating system, an application interface, text, a still image, or video content. To facilitate displaying images, the electronic display 12 may include a display panel with one or more display pixels. The display pixels may represent sub-pixels that each control a luminance of one color component (e.g., red, green, or blue for a red-green-blue (RGB) pixel arrangement).

The electronic display 12 may display an image by controlling the luminance of its display pixels based at least in part image data associated with corresponding image pixels in image data. In some embodiments, the image data may be generated by an image source, such as the processor core complex 18, a graphics processing unit (GPU), an image sensor, and/or memory 20 or storage devices 22. Additionally, in some embodiments, image data may be received from another electronic device 10, for example, via the network interface 24 and/or an I/O port 16.

Figure 2:
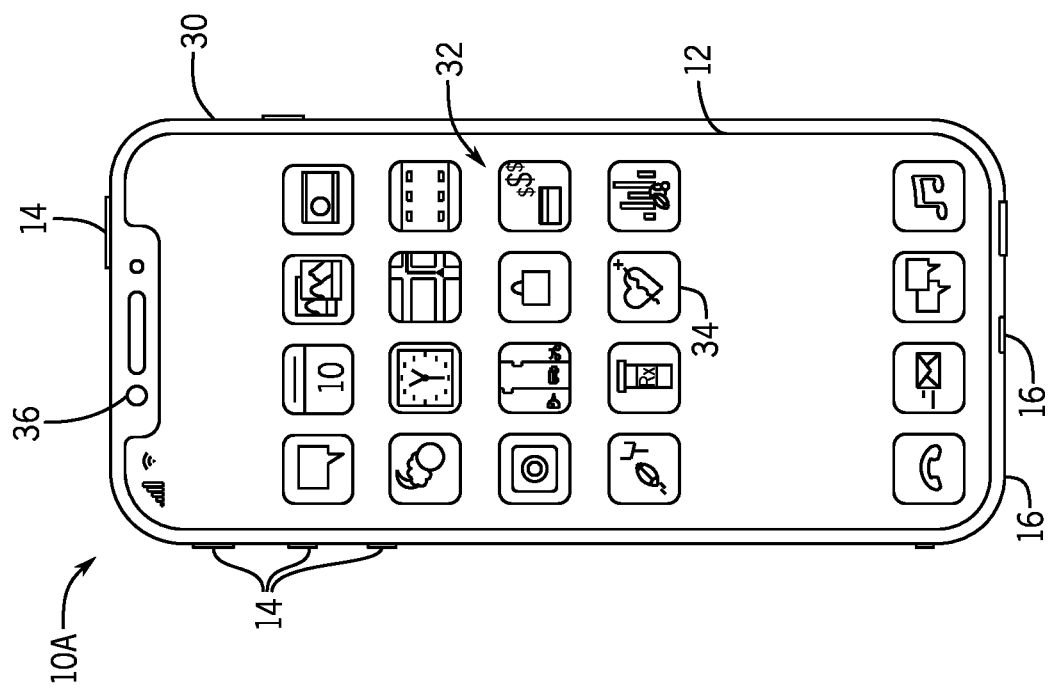
FIG. 2 is an example of the electronic device in the form of a handheld device, in accordance with an embodiment.

One example of the electronic device 10, specifically a handheld device 10A, is shown in FIG. 2. FIG. 2 is a front view of the handheld device 10A representing an example of the electronic device 10. The handheld device 10A may be a portable phone, a media player, a personal data organizer, a handheld game platform, and/or the like. For example, the handheld device 10A may be a smart phone, such as any iPhone® model available from Apple Inc.

The handheld device 10A includes an enclosure 30 (e.g., housing). The enclosure 30 may protect interior components from physical damage and/or shield them from electromagnetic interference. In the depicted embodiment, the electronic display 12 is displaying a graphical user interface (GUI) 32 having an array of icons 34. By way of example, when an icon 34 is selected either by an input device 14 or a touch sensing component of the electronic display 12, an application program may launch.

Input devices 14 may be provided through the enclosure 30. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. The I/O ports 16 also open through the enclosure 30. The I/O ports 16 may include, for example, a Lightning® or Universal Serial Bus (USB) port.

Figure 3:
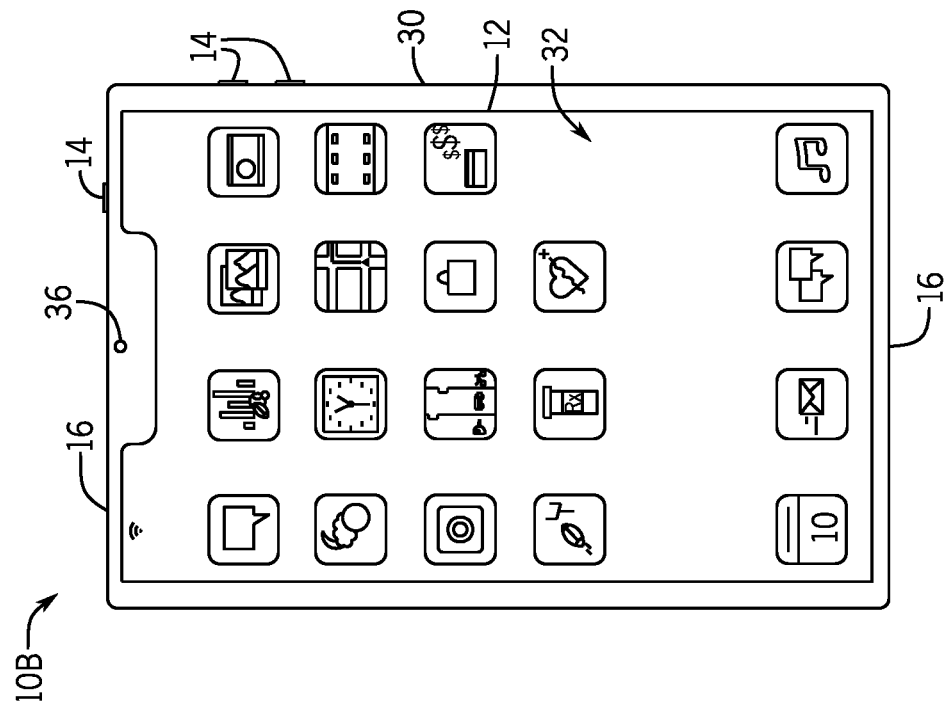
FIG. 3 is an example of the electronic device in the form of a tablet device, in accordance with an embodiment.
Figure 4:
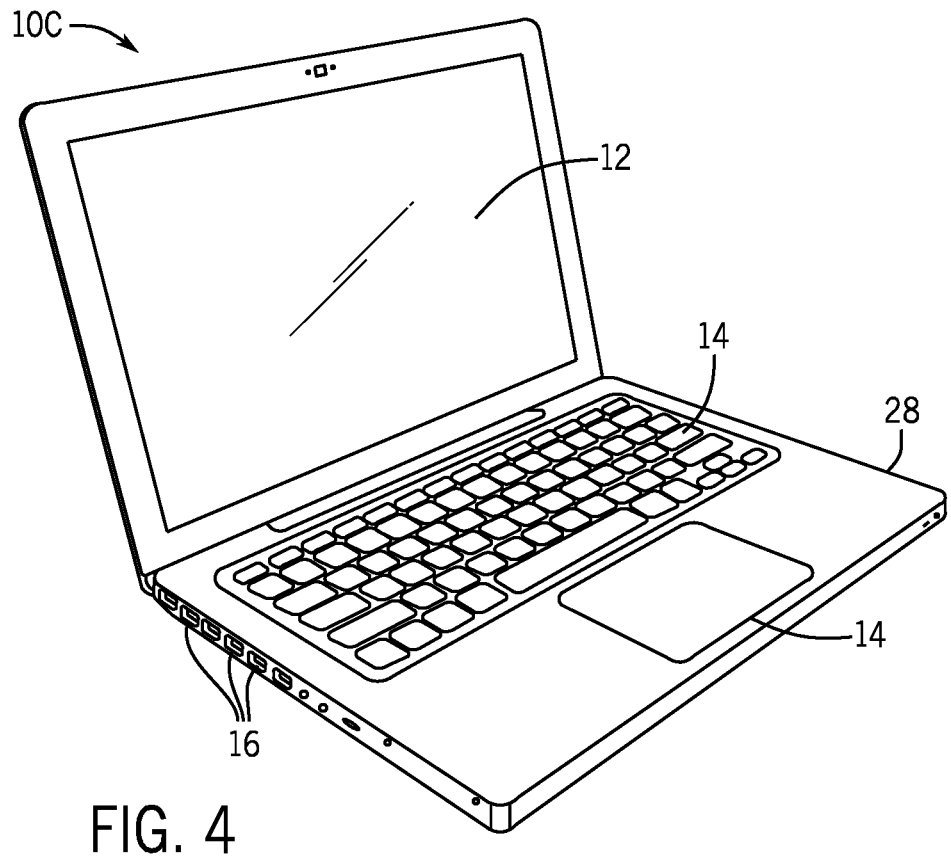
FIG. 4 is an example of the electronic device in the form of a notebook computer, in accordance with an embodiment.
Figure 5:
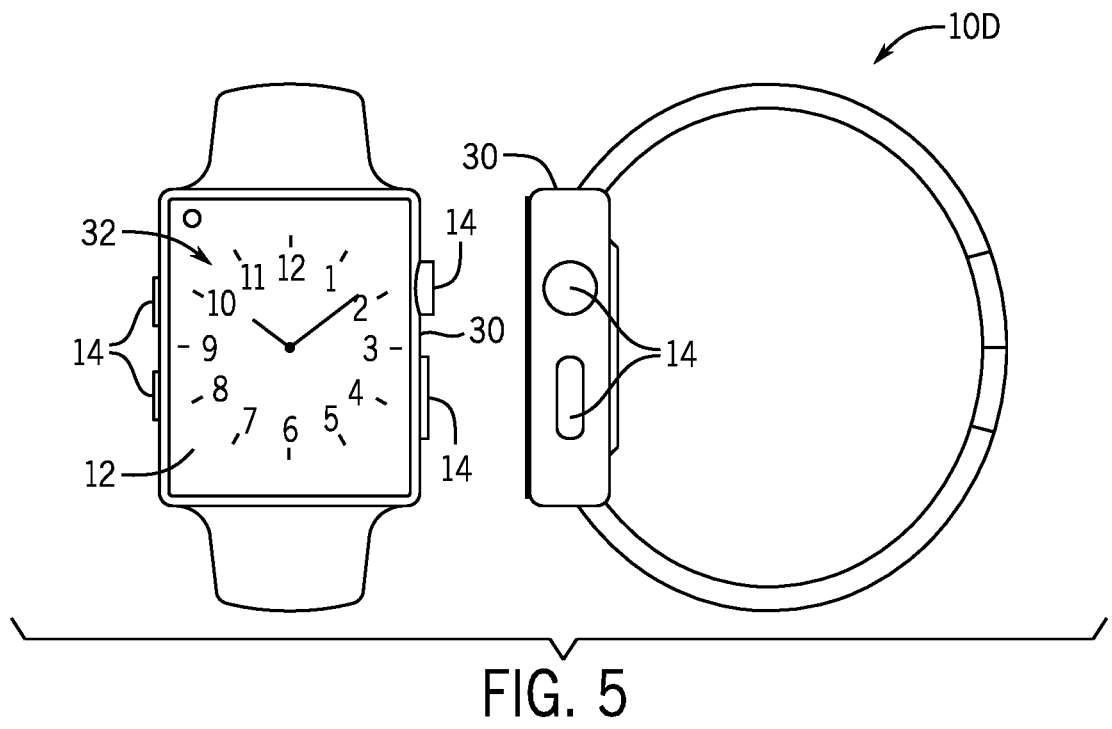
FIG. 5 is an example of the electronic device in the form of a wearable device, in accordance with an embodiment.

The electronic device 10 may take the form of a tablet device 10B, as shown in FIG. 3. FIG. 3 is a front view of the tablet device 10B representing an example of the electronic device 10. By way of example, the tablet device 10B may be any iPad® model available from Apple Inc. A further example of a suitable electronic device 10, specifically a computer 10C, is shown in FIG. 4. FIG. 4 is a front view of the computer 10C representing an example of the electronic device 10. By way of example, the computer 10C may be any MacBook® or iMac® model available from Apple Inc. Another example of a suitable electronic device 10, specifically a watch 10D, is shown in FIG. 5. FIG. 5 are front and side views of the watch 10D representing an example of the electronic device. By way of example, the watch 10D may be any Apple Watch® model available from Apple Inc. As depicted, the tablet device 10B, the computer 10C, and the watch 10D all include respective electronic displays 12, input devices 14, I/O ports 16, and enclosures 30.

Figure 6:
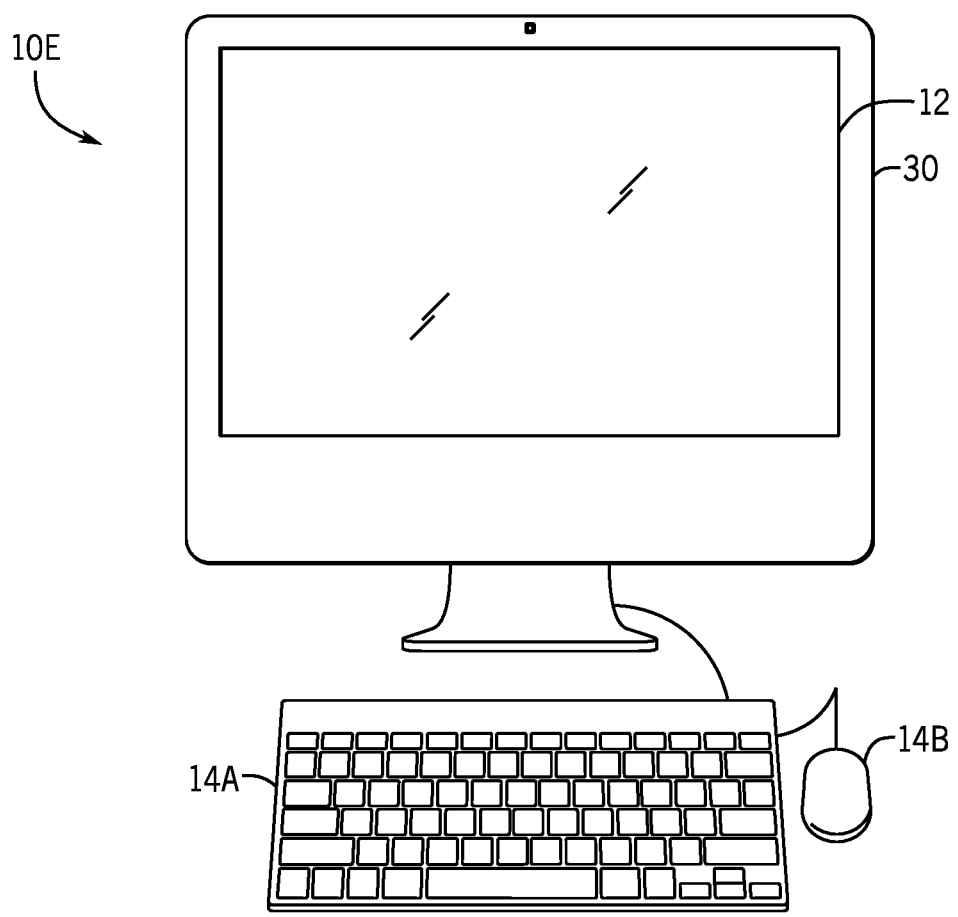
FIG. 6 is an example of the electronic device in the form of a desktop computer, in accordance with an embodiment.

Turning to FIG. 6, a computer 10E may represent another embodiment of the electronic device 10 of FIG. 1. The computer 10E may be any computer, such as a desktop computer, a server, or a notebook computer, but may also be a standalone media player or video gaming machine. By way of example, the computer 10E may be an iMac®, a MacBook®, or other similar device by Apple Inc. of Cupertino, California. It should be noted that the computer 10E may also represent a personal computer (PC) by another manufacturer. A similar enclosure 36 may be provided to protect and enclose internal components of the computer 10E, such as the electronic display 12. In certain embodiments, a user of the computer 10E may interact with the computer 10E using various peripheral input devices 14, such as the keyboard 14A or mouse 14B (e.g., input devices 14), which may connect to the computer 10E.

Figure 7:
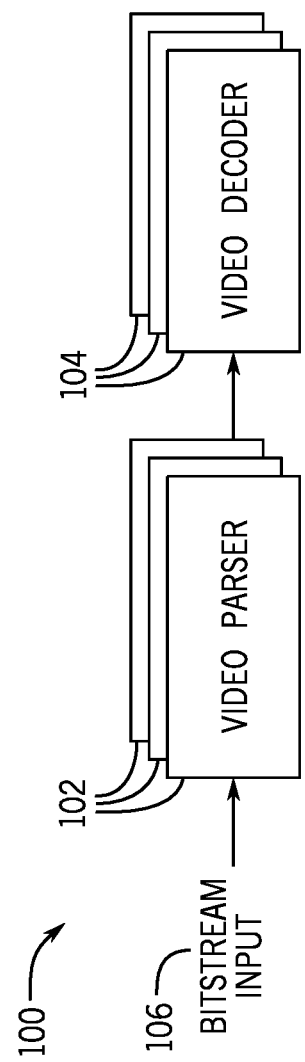
FIG. 7 is a block diagram of a video processing system including one or more video parsers and one or more decoders.

FIG. 7 is a block diagram of a video processing system 100 including one or more video parsers 102 and one or more decoders 104. The video parser 102 may receive an encoded video bitstream (bitstream 106) as input and may analyze and prepare the bitstream 106 for decoding by the decoders 104. In particular, the video parser 102 may analyze symbols of the bitstream and prepare the symbols for decoding by the decoders 104. A symbol may include a unit of data in the bitstream 106 that represents a particular piece of information. According to some video encoding specifications (e.g., the AV1 video encoding specification), each symbol may be encoded using a variable-length binary code based on its probability of occurrence. The probabilities for different symbols may be determined by a video encoder based on the characteristics of the video data. A cumulative distribution function (CDF) may be associated with each symbol based on each symbol's probability of occurrence.

Figure 8:
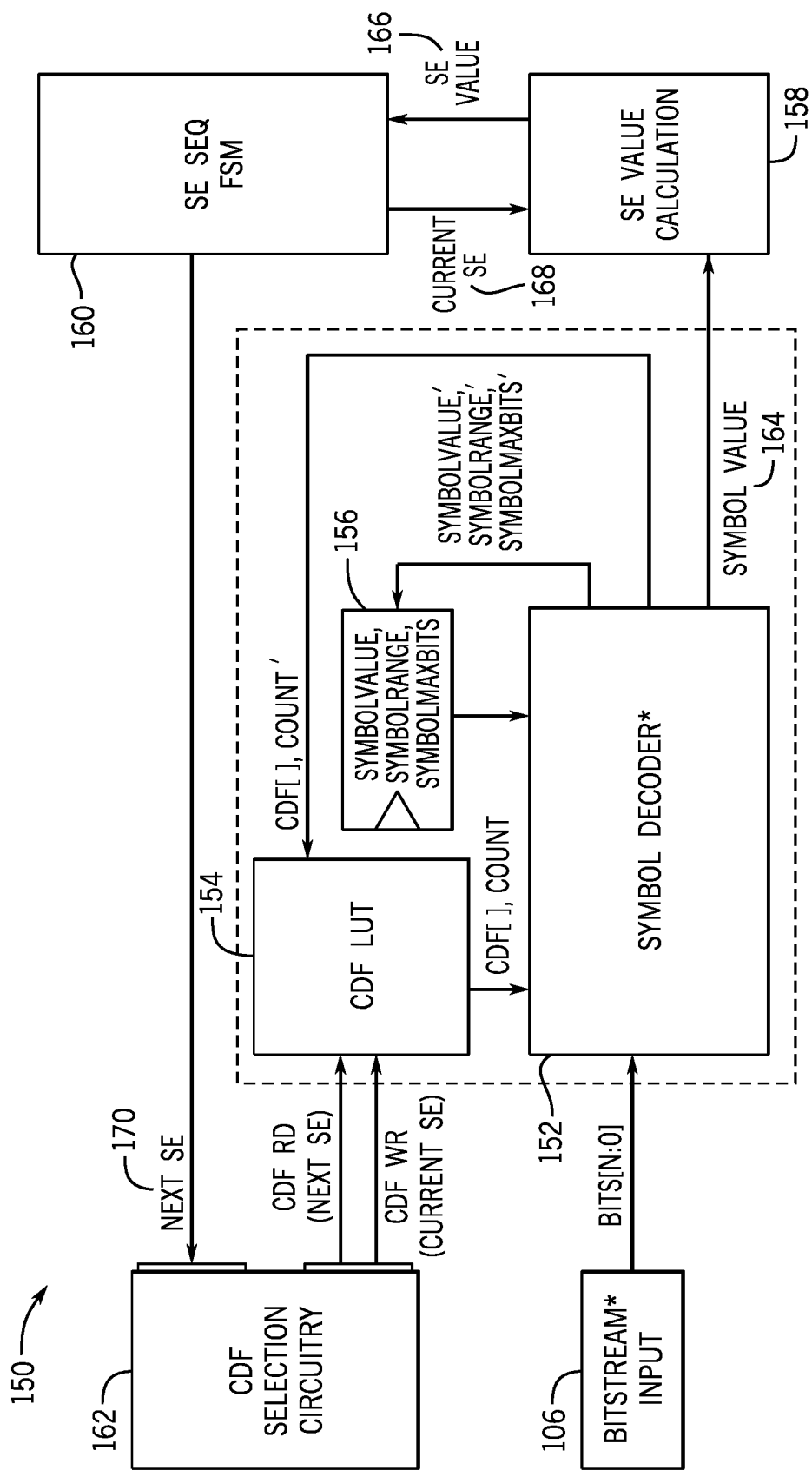
FIG. 8 is a block diagram of multi-symbol decoding circuitry that enables decoding of multiple symbols per clock cycle, in accordance with an embodiment.

FIG. 8 is a block diagram of multi-symbol decoding circuitry 150 that enables decoding of multiple symbols per clock cycle, according to embodiments of the present disclosure. Circuitry, as used herein, may refer to software components, hardware components, software executed on designated hardware components, or a combination of software and hardware components. The multi-symbol decoding circuitry 150 may enable decoding of multiple symbols per clock cycle for various symbol types. For example, the multi-symbol decoding circuitry 150 may enable decoding of multiple sign bit symbols per clock cycle, multiple coefficient base symbols per clock cycle, or multiple decoding of any other symbol appropriate for video decoding. The multi-symbol decoding circuitry 150 may be implemented or disposed within the video decoders 104.

The multi-symbol decoding circuitry 150 includes one or more symbol decoders 152, a cumulative distribution frequency (CDF) lookup table (LUT) 154, a register 156, syntax element calculation circuitry 158, a syntax element sequencing finite state machine (FSM) 160, and CDF selection circuitry 162. The symbol decoder 152 may receive as input the bitstream 106. The symbol decoder 152 may receive the bitstream 106 directly or may receive the bitstream 106 from the video parser 102. In order for the symbol decoder 152 to decode a syntax element, the symbol decoder may estimate certain information about a symbol or of each symbol of a group of symbols corresponding to the syntax element according to a CDF corresponding to the symbol or each symbol of the group of symbols. The symbol decoder 152 may receive from the CDF LUT 154 a CDF corresponding to the present symbol the symbol decoder 152 is decoding. The CDF LUT 154 may determine the present symbol to be decoded based on an indication (e.g., a RAM address) received from the CDF selection circuitry 162.

The symbol decoder 152 receives a CDF from the CDF LUT 154 and receives additional information regarding the present symbol to be decoded from the register 156. The additional information may include a symbol value, a symbol range, and a maximum number of symbol bits. The register 156 may begin with initial values for the symbol value, symbol range, and the maximum number of symbol bits. Using the information obtained from the CDF LUT 154 and the register 156, the symbol decoder 152 may determine an updated symbol 164 used to enable decoding multiple symbols from the bitstream 106 per clock cycle. As the symbol decoder 152 generates the updated symbol values 164, the symbol decoder 152 may transmit new symbol values (e.g., SymbolValue'), new symbol ranges (e.g., SymbolRange'), and new maximum numbers of symbol bits (e.g., SymbolMaxBits') to be stored in the register 156. In this manner, the symbol decoder 152 may determine the symbol 164 based on information associated with previously decoded symbols. It should be noted that multiple decoding per cycle for some symbols may be accomplished without the use of the CDF LUT 154. For example, sign bit symbols may be associated with a fixed CDF (e.g., a fixed probability of 50%) and thus will not rely on the CDF LUT 154 to determine a specific CDF for any particular sign bit symbol.

The symbol decoder 152 outputs the updated symbol 164 to the syntax element calculation circuitry 158 to determine a syntax element calculation based on the updated symbol 164. The syntax element calculation circuitry 158 outputs the syntax element value to the syntax element sequencing FSM 160 to sequence the syntax element based on the syntax element value 166. The syntax element sequencing FSM 160 may output present syntax element data 168 to the syntax element calculation circuitry 158. Accordingly, the syntax element calculation circuitry 158 may determine the syntax element value 166 based on the symbol 164 and the present syntax element data 168. The syntax element sequencing FSM 160 may output next syntax element data 170 to the CDF selection circuitry 162. The CDF selection circuitry 162 may output a subsequent address corresponding to the next syntax element or the next symbol to the CDF LUT 154. Using this information, the CDF LUT 154 may output a CDF corresponding to the next syntax element or the next symbol to be decoded by the symbol decoder 152.

Figure 9:
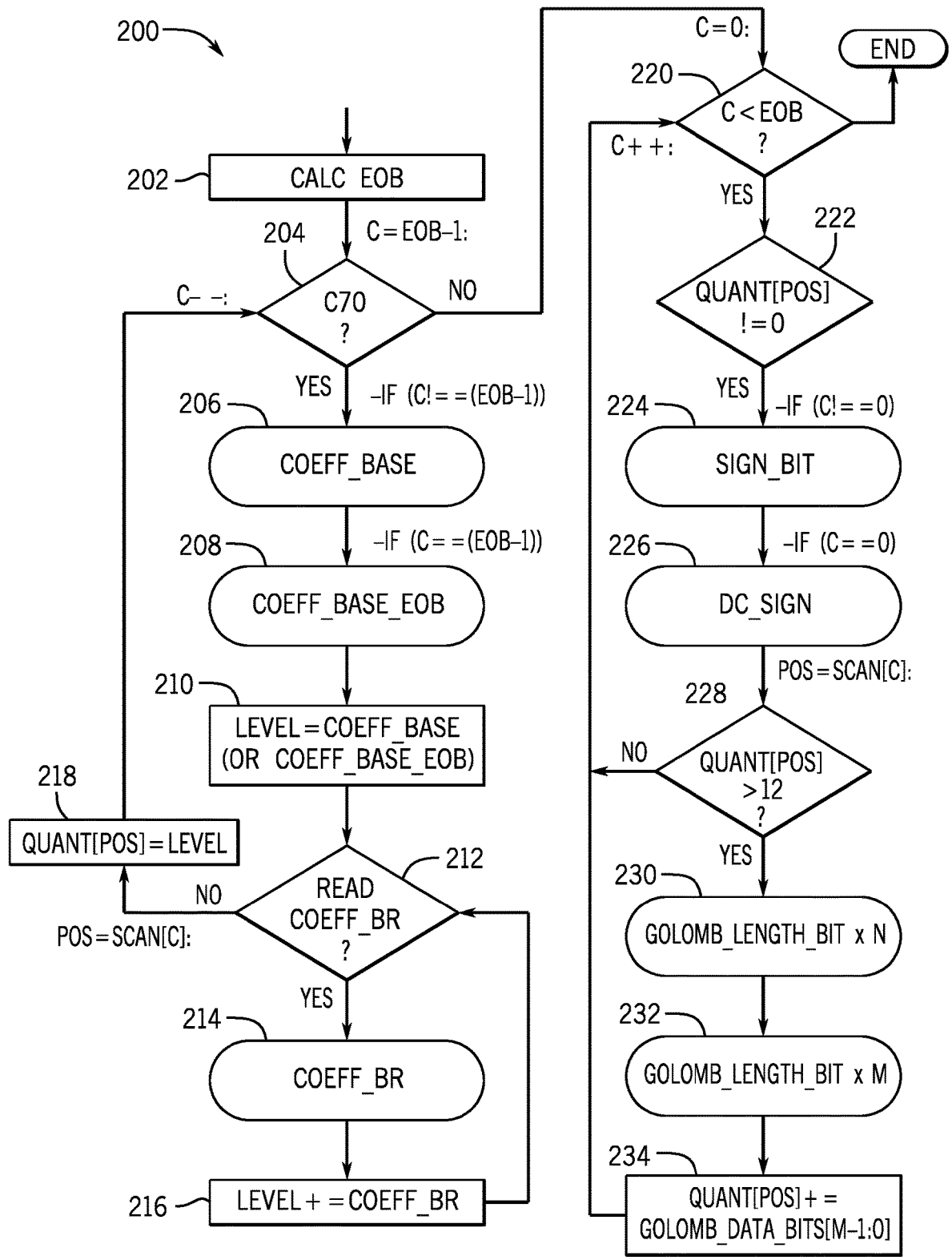
FIG. 9 is a flowchart of a method for decoding multiple symbols per clock cycle via the multi-symbol decoding circuitry, in accordance with an embodiment.

FIG. 9 is a flowchart of a method 200 for decoding multiple symbols per clock cycle via the multi-symbol decoding circuitry 150 according to embodiments of the present disclosure. Any suitable device (e.g., a controller) that may control components of the electronic device 10, such as data processing circuitry of the processor core complex 18 or various circuitry or components of the multi-symbol decoding circuitry 150, such as the symbol decoder 152, may perform the method 200. In some embodiments, the method 200 may be implemented by executing instructions stored in a tangible, non-transitory, computer-readable medium, such as the memory 20 or storage devices 22, using the processor core complex 18. For example, the method 200 may be performed at least in part by one or more software components, such as an operating system of the electronic device 10, one or more software applications of the electronic device 10, and the like. While the method 200 is described using steps in a specific sequence, it should be understood that the present disclosure contemplates that the described steps may be performed in different sequences than the sequence illustrated, and certain described steps may be skipped or not performed altogether.

In process block 202, the multi-symbol decoding circuitry 150 may determine one or more locations indicating an end-of-block (EOB) position of a level buffer (e.g., indicating an end of a video block), and determine a count c equal to EOB−1. The total number of levels to be decoded in the level buffer is equal to the EOB value. The count c may indicate a present position in the level buffer. In query block 204, the multi-symbol decoding circuitry 150 determines if the count is greater than or equal to 0. That is, in query block 204, the multi-symbol decoding circuitry 150 may determine if the multi-symbol decoding circuitry 150 has reached the EOB. If the count is greater than 0, the multi-symbol decoding circuitry 150 will determine whether the count is equal to EOB−1 to determine if the present position is the last block prior to the EOB. If the count is not equal to EOB−1, in process block 206, the multi-symbol decoding circuitry 150 may decode the coefficient base. However, if the count is equal to EOB−1 (e.g., indicating that the present position is the last block before the EOB), in process block 208, the multi-symbol decoding circuitry 150 may perform a different calculation to decode the last coefficient base symbol.

The number of levels to be decoded is equal to the EOB value. 1×coeff_base_eob+(EOB−1)×coeff_base are decoded in the decode loop. These may be the initial LEVEL values which may include a value from 0-3. In process block 210, the multi-symbol decoding circuitry 150 may store the decoded coefficient base value or the decoded coefficient base EOB value into the level buffer. In query block 212, the multi-symbol decoding circuitry 150 determines whether coefficient syntax elements (coeff_br) are nonzero. A coeff_br may be present (e.g., non-zero) if the corresponding initial LEVEL includes a value of 3. The coeff_br may also include a value of 0-3. If a decoded coefficient syntax element has a value of 3, it may imply that another coeff_br is present. In some instances, there may be up to 4×coeff_br. LEVEL may be updated accordingly. The final LEVEL value may be from 0-15.

If the coefficient syntax elements are nonzero, the coefficient syntax elements will be read. If the coefficient syntax elements are read, in process block 214 the coefficient syntax elements will be decoded. Level may be visualized as a sum of coeff_base' added to 0-4 coeff_br.

$$\text{LEVEL} = \text{coeff\_base}' + \text{coeff\_br}(0) + \text{coeff\_br}(1) + \text{coeff\_br}(2) + \text{coeff\_br}(3) \qquad \text{(Equation 1)}$$

Coeff_base' may include either coeff_base or coeff_base_eob. Coeff_br (i) may be inferred to be 0 if it is not present. The maximum number of coefficient syntax elements to be decoded per level may be any appropriate number, such as 1 or more, 2 or more, 3 or more, 4 or more, 5 or more, and so on. In process block 216, an initial LEVEL value (e.g., 3) from decoded value of coeff_base' up to max LEVEL value of 15 after decoding extra coeff_br syntax elements.

If it is determined in the query block 212 that a coeff_br value is 3 and a number of coeff_br that have been decoded is less than 4, the multi-symbol decoding circuitry 150 may continue to decode more coeff_br up until a maximum number (e.g., 4) coeff_br have been decoded. In process block 218, the multi-symbol decoding circuitry may save a decoded LEVEL into a LEVEL buffer (e.g., QUANT [ ] at position POS. For example, if QUANT [POS] is equal to 15, the final QUANT [POS] value needs to be adjusted. The corresponding Golomb_length_bit and golomb_data_bit are read while decoding sign bit for QUANT [POS]. At the query block 204, the multi-symbol decoding circuitry 150 may determine the transition from decoding coeff_base'/coeff_br to sign_bit/dc_sign. For coeff_base/coeff_br decode, C is counting from EOB−1 to 0. C=−1 is the exit condition with C−− decrement before the query block 204. For sign_bit/dc_sign decode, C is counting from 0 to EOB−1. C=EOB is the exit condition with C++ increment before the process block 220. C is used to generate POS which is the QUANT [ ] level buffer index. That, POS=SCAN [C] where SCAN [ ] is a function to make the decoding order C to level buffer position. If the count is less than EOB, the symbol decoder 152 may, in process block 222, determine if the present value of QUANT [POS] (e.g., the value in level buffer pointed to by POS position index) is equal to zero. If the value of QUANT [POS] is not equal to zero and C is not equal to zero, the symbol decoder 152 may, in process block 224, decode the present sign bit symbol or sign bit symbols if multiple are present. However, if the value of QUANT [POS] is not equal to zero and C is equal to zero, the multi-symbol decoding circuitry 150 may decode the sign bit syntax element in process block 226. There may be only one sign bit syntax element to be decoded if it is present (i.e., either SIGN_BIT for C is not equal to 0 or DC_SIGN for C is equal to 0). In query block 228, the multi-symbol decoding circuitry 150 may determine the size of a present coefficient base symbol value. If the initial decoded QUANT [POS] value is above a threshold size, the multi-symbol decoding circuitry 150 will, in process blocks 230 and 232, decode Golomb length bits and Golomb data bits. Decoding the Golomb length bits and the Golomb data bits enables the multi-symbol decoding circuitry 150 to compensate for the large coefficient base symbol value. In process block 234, the value in the level buffer, QUANT [POS] pointed to by quantization index (that is to be increased by Golomb data bits) is updated based on the Golomb data bits, the count is incremented by 1, and the multi-symbol decoding circuitry 150 returns to the query block 220.

Figure 10:
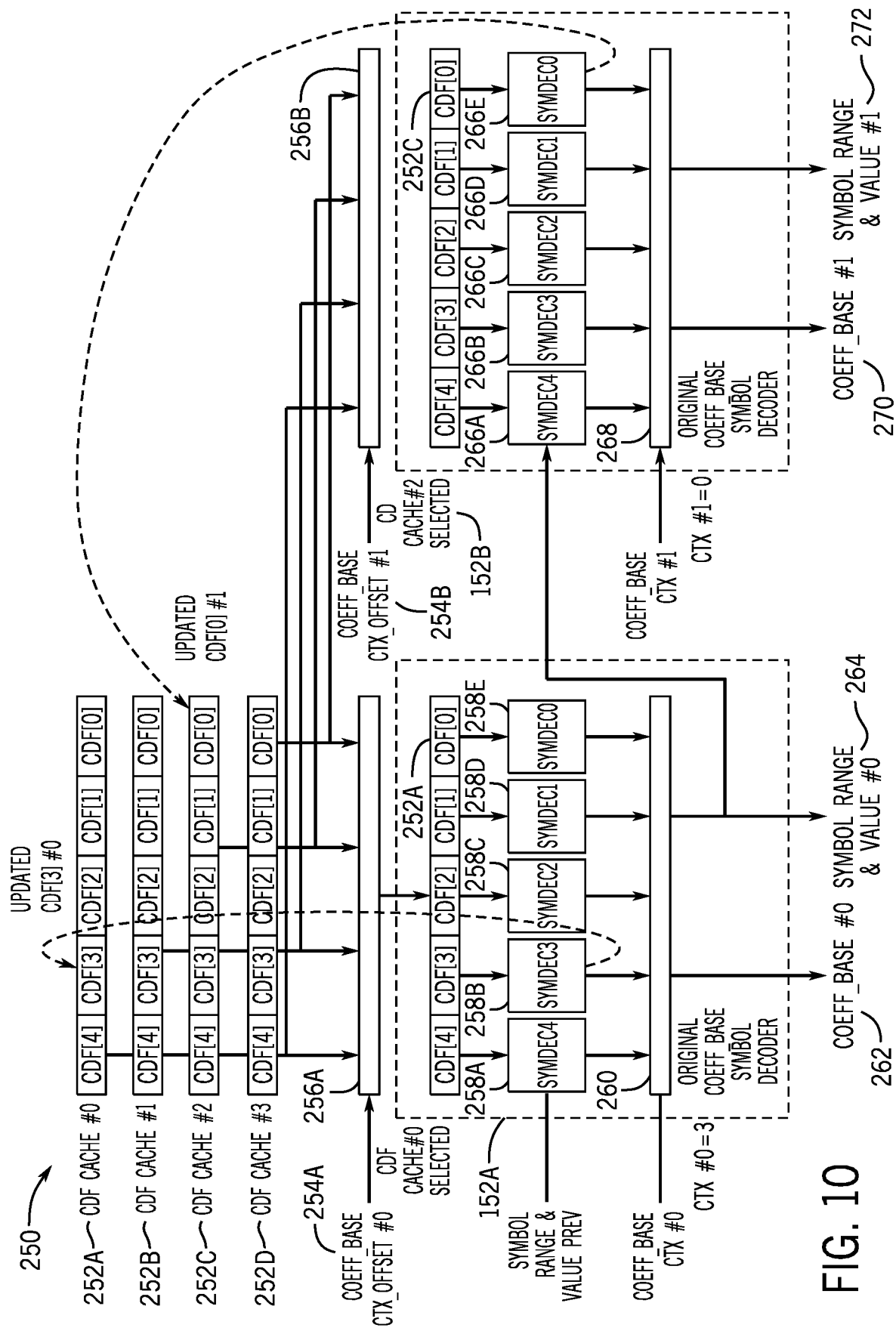
FIG. 10 is a block diagram illustrating the operation of multiple coefficient base symbol decoding circuitry, in accordance with an embodiment.

FIG. 10 is a block diagram illustrating the operation of multiple coefficient base symbol decoding circuitry 250 that may decode multiple coefficient base symbols per clock cycle, according to embodiments of the present disclosure. The multiple coefficient base symbol decoding circuitry 250 includes symbol decoders 152A and 152B (collectively, the symbol decoders 152), wherein each symbol decoder 152A and 152B may operate in parallel to decode a first coefficient base symbol and a second coefficient base symbol, respectively. The symbol decoders 152 may decode coefficient base symbols based on a selection of one of multiple CDF caches 252A, 252B, 252C and 252D (collectively, the CDF caches 252) based on coefficient base offsets 254A and 254B (collectively, the coefficient base offsets 254). The CDF caches 252 may be received from the CDF LUT 154, as discussed with respect to FIG. 8 above. Each of the CDF caches 252 may include five different CDF values based on a particular coefficient base offset.

Figures 11, 12:
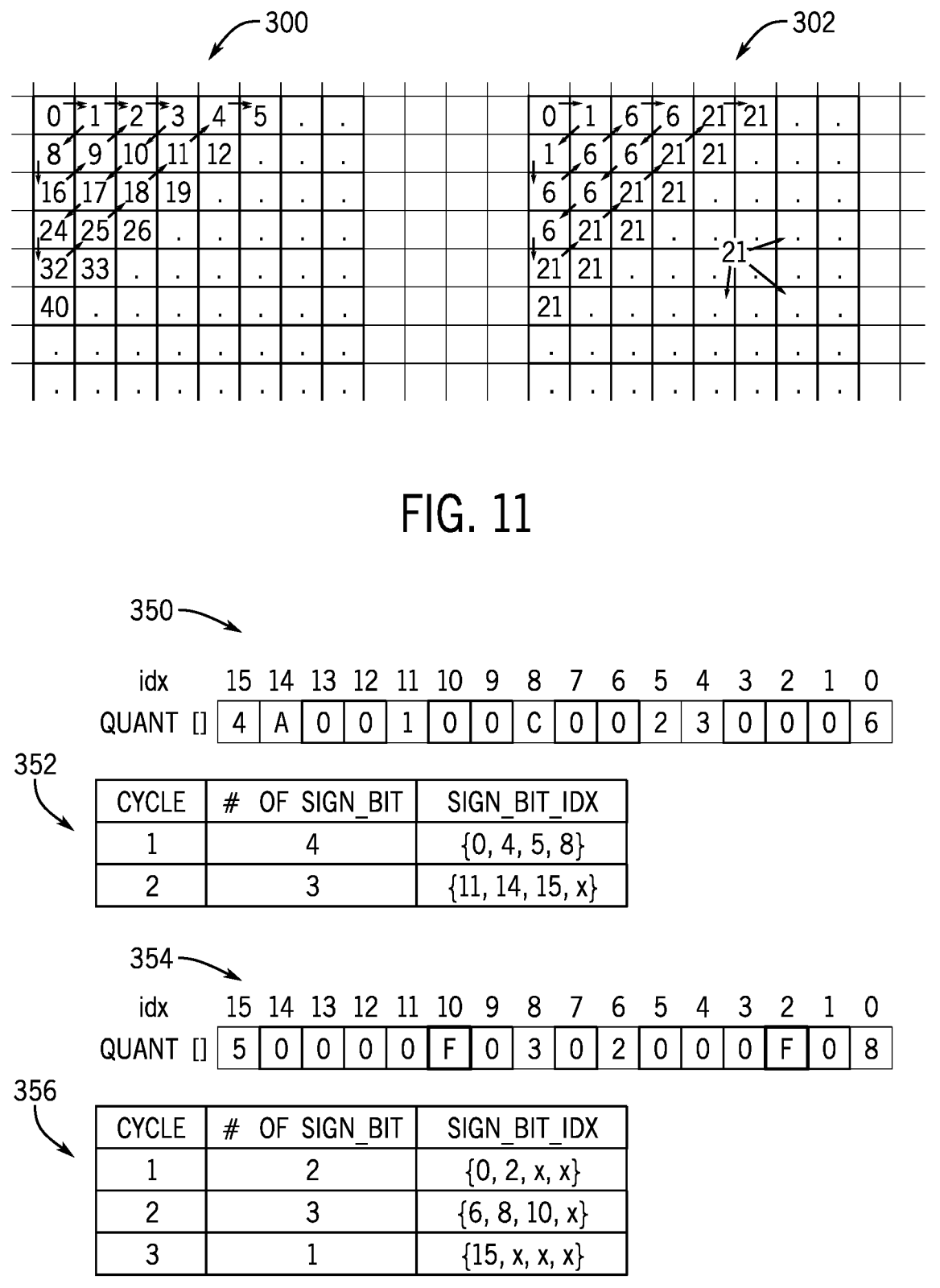

The coefficient base offsets 254 may be selected based on a two-dimensional frequency-domain position of a coefficient to be decoded. FIG. 11 is an illustration of a video block 300 indicating the order in which coefficient base values are programmed into the index positions of the video block 300, according to an embodiment of the present disclosure. FIG. 11 includes the video block 302 indicating the coefficient base offset corresponding to each index of the video block 300. For example, the first coefficient base value programmed (e.g., the coefficient base value at index 0) corresponds to a coefficient base offset of 0. The eighth coefficient base value programmed (e.g., the coefficient base value at index 8) corresponds to a coefficient base offset of 6. The nineteenth coefficient base value programmed (e.g., the coefficient base value at index 19) corresponds to a coefficient base offset of 21, and so on.

Returning to FIG. 10, the CDF caches 252 may each corresponds to a coefficient base offset value. For example, the CDF cache 252A may correspond to an offset of 0, the CDF cache 252B may correspond to an offset of 1, the CDF cache 252C may correspond to an offset of 6, and the CDF cache 252D may correspond to an offset of 21. Other possible offsets include 11, 26, 31, 36, and so on. Each of the CDF caches 252 may be input into multiplexer 256A and 256B. The symbol decoders 152A and 152B may each select one of the CDF caches 252 based on the coefficient base offsets 254A and 254B, respectively. For example, the symbol decoder 152A may select the CDF cache 252A based on the coefficient base offset 254A. That is, the symbol decoder 152A may be decoding a coefficient base symbol at index 0, and the CDF cache 252A may be based on an offset of 0. Using the selected CDF cache 252, symbol range and previous decoded coefficient base symbol values, the symbol decoder 152A may decode five coefficient base symbols 258A, 258B, 258C, 258D, and 258E (collectively the coefficient base symbols 258) each based on a respective CDF value of the selected CDF cache 252. The symbol range and previous decoded coefficient base symbol values may include symbol range and previous decoded coefficient base symbol values from a previous clock cycle. All five decoded coefficient base symbols may be input into a multiplexer 260. The symbol decoder 152A may select one of the decoded coefficient base symbols 258 based on coefficient base context information from a previously decoded coefficient base symbol. The previously decoded coefficient base symbol may include a coefficient base symbol decoded during a previous clock cycle. Based on this selection, the symbol decoder 152A may output a decoded coefficient base symbol 262 and new symbol range and symbol value information 264, and update the selected CDF cache 252 with the new decoded coefficient base symbol 262 and new symbol range and symbol value information 264.

The decoded coefficient base symbol 262, the new symbol range and symbol value information 264, or both, may be sent to the symbol decoder 152B for used in decoding an additional coefficient base symbol during the same clock cycle as the coefficient base symbol 262 was decoded. The symbol decoder 152B may select one of the CDF caches 252 (e.g., the CDF cache 252C) based on the coefficient base offset 254B inputted into the multiplexer 256B. The symbol decoder 152B may decode the coefficient base symbols 266A, 266B, 266C, 266D, and 266E (collectively, the coefficient base symbols 266). The symbol decoder 152B may select one of the coefficient base symbols (e.g., the coefficient base symbol 266E) via selection by a multiplexer 268 based on coefficient base context information from a previously decoded coefficient base value decoded by the symbol decoder 152A during the same clock cycle as the coefficient base symbols 266 are being decoded. Based on the selection, the symbol decoder 152B may output an additional decoded coefficient base symbol 270 and symbol range and symbol value information 272. In this manner, the multiple coefficient base symbol decoding circuitry 250, via the symbol decoders 152A and 152B, may decode multiple coefficient base symbols per clock cycle. In some instances, there may be a restriction in performing multiple coeff_base symbols decoding. Multiple coeff_base symbols decoding may be based on continuous coeff_base symbols to be present and pairing two coeff_base symbols. However, this continuity may be broken if coeff_br is present. In this case, only one coeff_base symbol is decoded before coeff_br symbols, if two coeff_base symbols cannot be paired before coeff_br. After coeff_br is decoded, multiple coeff_base symbols may resume.

FIG. 12 illustrates examples of decoding multiple sign bit symbols per clock cycle, according to embodiments of the present disclosure. The multi-symbol decoding circuitry 150 may analyze a level buffer 350 having 16 quantization values (15:0), wherein the quantization values represent coefficient base symbol values determined as described with respect to FIG. 10. Coefficient base symbols with a value of zero will not have a sign, and thus may be skipped. Consequently, the multi-symbol decoding circuitry 150 may only read and decode sign bit symbols for nonzero quantization values as discussed with respect to FIG. 9. As may be observed from the level buffer 350, the indices 0, 4, 5, 8, 11, and 14-15 all have nonzero quantization values (e.g., nonzero coefficient base symbols), and sign bit symbols will be decoded by the multi-symbol decoding circuitry 150 for each of the quantization values corresponding to these indices.

As shown in table 352, four sign bit symbols may be decoded per clock cycle. Starting from the least significant bit (e.g., corresponding to index 0), the sign bit symbols corresponding to indices 0, 4, 5, and 8 may be decoded may be decoded in a first clock cycle, while the sign bit symbols corresponding to indices 11, 14, and 15 may be decoded in a second clock cycle. As previously discussed, excessively large decoded coefficient base symbols may result in excessively large quantization values that may cause corresponding sign bit symbols to be decoded differently by decoding Golomb length bits and Golomb data bits. Moreover, the excessively large quantization values may prevent continuous decoding of the sign bit symbols, as the excessively large quantization values are not continuous. Accordingly, excessively large quantization values may break the continuity of the multi-sign bit symbol decoder, and the multi-symbol decoding circuitry 150 may be prevented from decoding any additional sign bit symbols in that clock cycle.

Level buffer 354 includes nonzero quantization values corresponding to the indices 0, 2, 6, 8, 10, and 15. As may be appreciated, the quantization values corresponding to the indices 2 and 10 are excessively large. Thus, as may be observed from the table 356, the multi-symbol decoding circuitry 150 may decode sign bit symbols corresponding to the index 0 and the index 2, but the excessively large quantization value of the index 2 breaks continuity of the multi-sign bit symbol decoding, and thus no other sign bit symbols may be decoded for the first clock cycle. In the second clock cycle, the multi-symbol decoding circuitry 150 may decode the sign bit symbols corresponding to indices, 6, 8, and 10. The excessively large quantization value of the index 10 breaks continuity of the multi-sign bit symbol decoding, and thus no other sign bit symbols may be decoded for the second clock cycle. In the third clock cycle, the multi-symbol decoding circuitry 150 decodes the sign bit symbol corresponding to the index 15.

While four sign bit symbols are being shown as decoded for each clock cycle, it should be noted that this is merely illustrative, and any appropriate number of sign bit symbols may be decoded for each clock cycle. For example, the multi-symbol decoding circuitry 150 may decode 2 or more sign bit symbols per clock cycle, 3 or more sign bit symbols per clock cycle, 5 or more sign bit symbols per clock cycle, 10 or more sign bit symbols per clock cycle, and so on.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform] ing [a function] . . . " or "step for [perform] ing [a function] . . . ," it is intended that such elements are to be interpreted under 35 U.S.C. 112 (f). However, for any claims containing elements designated in any other manner, it is intended that such elements are not to be interpreted under 35 U.S.C. 112 (f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. An electronic device, comprising:
   a video parser configured to receive an encoded video bitstream; and
   a video decoder configured to receive the encoded video bitstream from the video parser and decode the encoded video bitstream, the video decoder comprising:
   a cumulative distribution function (CDF) lookup table; and
   multiple symbol decoders sharing access to the CDF lookup table and configured to use the CDF lookup table to decode multiple coefficient base symbols per clock cycle.

2. The electronic device of claim 1, wherein the multiple symbol decoders comprise:
   a first symbol decoder configured to decode at least a first coefficient base symbol per clock cycle; and
   a second symbol decoder configured to decode at least a second coefficient base symbol per clock cycle.

3. The electronic device of claim 2, wherein the second symbol decoder is configured to decode the at least the second coefficient base symbol based on information associated with the at least the first coefficient base symbol.

4. The electronic device of claim 3, wherein the information associated with the at least the first coefficient base symbol comprises symbol range information and symbol value information.

5. The electronic device of claim 1, wherein the multiple symbol decoders are configured to decode multiple sign-bit symbols per clock cycle.

6. The electronic device of claim 1, wherein the multiple symbol decoders are configured to decode the multiple coefficient base symbols per clock cycle based on respective CDF caches selected from the CDF lookup table.

7. Video decoding circuitry, comprising:
a first symbol decoder configured to:
    select a first cumulative distribution function (CDF) cache from a CDF lookup table, the first CDF cache comprising a first plurality of CDF values;
    decode a first plurality of symbols based on respective CDF values of the first CDF cache; and
    output a first decoded symbol of the first plurality of symbols;
a second symbol decoder configured to:
    select a second CDF cache from the CDF lookup table, the second CDF cache comprising a second plurality of CDF values;
    decode a second plurality of symbols based on respective CDF values of the second CDF cache; and
    output a second decoded symbol of the second plurality of symbols.

8. The video decoding circuitry of claim 7, wherein the first symbol decoder is configured to output the first decoded symbol and the second symbol decoder is configured to output the second decoded symbol during a clock cycle.

9. The video decoding circuitry of claim 7, wherein the first plurality of symbols, the second plurality of symbols, or both comprise coefficient base symbols.

10. The video decoding circuitry of claim 7, wherein the first plurality of symbols, the second plurality of symbols, or both comprise sign bit symbols.

11. The video decoding circuitry of claim 7, wherein the first symbol decoder is configured to select the first CDF cache based on a two-dimensional frequency-domain position of a coefficient base symbol to be decoded.

12. The video decoding circuitry of claim 7, wherein the first symbol decoder is configured to output the first decoded symbol based on coefficient base context information from a coefficient base symbol decoded in a previous clock cycle.

13. The video decoding circuitry of claim 7, wherein the first symbol decoder is configured to output symbol range and symbol value information associated with the first decoded symbol, and wherein the second symbol decoder is configured to receive the symbol range and symbol value information associated with the first decoded symbol.

14. The video decoding circuitry of claim 13, wherein the second symbol decoder is configured to decode the second plurality of symbols based on the symbol range and symbol value information associated with the first decoded symbol, wherein the first plurality of symbols and the second plurality of symbols are decoded during a same clock cycle.

15. The video decoding circuitry of claim 7, wherein the second symbol decoder is configured to output symbol range and symbol value information associated with the second decoded symbol.

16. The video decoding circuitry of claim 7, wherein the first symbol decoder is configured to update the first CDF cache based on the first decoded symbol.

17. The video decoding circuitry of claim 7, wherein the second symbol decoder is configured to update the second CDF cache based on the second decoded symbol.

18. A tangible, non-transitory, computer-readable medium comprising computer-readable instructions that, when executed, are configured to cause one or more processors to:
    select a first cumulative distribution function (CDF) cache via a CDF lookup table;
    cause a symbol decoder to decode a plurality of coefficient base symbols;
    cause the symbol decoder to store the plurality of coefficient base symbols in a level buffer as indexed quantization values;
    cause the symbol decoder to determine a portion of the indexed quantization values corresponding to nonzero coefficient base symbols; and
    cause the symbol decoder to decode a plurality of sign bit symbols corresponding to the portion of the indexed quantization values.

19. The tangible, non-transitory, computer-readable medium of claim 18, wherein the computer-readable instructions, when executed are configured to cause the one or more processors to determine a size associated with each of the nonzero coefficient base symbols.

20. The tangible, non-transitory, computer-readable medium of claim 19, wherein the computer-readable instructions, when executed are configured to cause the one or more processors to stop decoding the sign bit symbols in response to determining that the size associated with a nonzero coefficient base symbol of the nonzero coefficient base symbols is greater than a threshold size.

21. The tangible, non-transitory, computer-readable medium of claim 18, wherein the computer-readable instructions, when executed are configured to cause the one or more processors to select the first CDF cache by inputting a select signal into a multiplexer based on a coefficient base symbol offset, wherein the coefficient base symbol offset is determined by a two-dimensional frequency-domain position of a coefficient base symbol to be decoded.

* * * * *